United States Patent
Cropper et al.

(10) Patent No.: US 10,067,803 B2
(45) Date of Patent: Sep. 4, 2018

(54) POLICY BASED VIRTUAL MACHINE SELECTION DURING AN OPTIMIZATION CYCLE

(71) Applicant: International Business Machines Corporation, Armonk, NY (US)

(72) Inventors: Joseph W. Cropper, Rochester, MN (US); Jennifer D. Mulsow, Cedar Park, TX (US); Taylor D. Peoples, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 14/951,911

(22) Filed: Nov. 25, 2015

(65) Prior Publication Data
US 2017/0147399 A1    May 25, 2017

(51) Int. Cl.
| | |
|---|---|
| G06F 9/455 | (2018.01) |
| G06F 9/46 | (2006.01) |
| G06F 15/173 | (2006.01) |
| G06F 9/50 | (2006.01) |
| G06F 9/48 | (2006.01) |

(52) U.S. Cl.
CPC ............ *G06F 9/5088* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/50* (2013.01); *G06F 9/505* (2013.01); *G06F 9/5005* (2013.01); *G06F 9/5027* (2013.01); *G06F 9/5055* (2013.01); *G06F 9/5077* (2013.01); *G06F 9/5083* (2013.01); *G06F 2009/4557* (2013.01);
(Continued)

(58) Field of Classification Search
None
See application file for complete search history.

(56) References Cited

U.S. PATENT DOCUMENTS

| | | |
|---|---|---|
| 8,332,847 B1 | 12/2012 | Hyser et al. |
| 9,037,689 B2 | 5/2015 | Khandekar et al. |
| | (Continued) | |

OTHER PUBLICATIONS

VMware, Inc., vSphere Distributed Resource Scheduler& Distributed Power Management, retrieved Nov. 24, 2015, 2 pages, <http://www.vmware.com/products/vsphere/features/drs-dpm>.
(Continued)

*Primary Examiner* — Charles M Swift
(74) *Attorney, Agent, or Firm* — Patterson + Sheridan, LLP

(57) ABSTRACT

Systems, methods, and computer program products configured to perform an operation comprising determining that use of a system resource of a first host system exceeds a threshold, wherein the first host system executes a plurality of virtual machines in a cloud computing environment, identifying a first virtual machine, of the plurality of virtual machines, for migration based on a first migration policy, of a plurality of migration policies, wherein the plurality of migration policies specify a respective set of rules for identifying virtual machines for migration, and migrating the first virtual machine to a second host system in the cloud computing environment to reduce the use of the system resource on the first host system.

11 Claims, 8 Drawing Sheets

(52) U.S. Cl.
CPC .............. *G06F 2009/45575* (2013.01); *G06F 2009/45595* (2013.01)

(56) References Cited

U.S. PATENT DOCUMENTS

| | | | |
|---|---|---|---|
| 2006/0069761 A1* | 3/2006 | Singh | H04L 67/1008 709/222 |
| 2009/0106409 A1* | 4/2009 | Murata | G06F 9/5077 709/223 |
| 2009/0228589 A1* | 9/2009 | Korupolu | H04L 67/1097 709/226 |
| 2010/0169253 A1* | 7/2010 | Tan | G06F 9/5088 706/21 |
| 2010/0268816 A1* | 10/2010 | Tarui | H04L 12/00 709/224 |
| 2010/0332889 A1 | 12/2010 | Shneorson et al. | |
| 2011/0219372 A1 | 9/2011 | Agrawal et al. | |
| 2012/0137292 A1* | 5/2012 | Iwamatsu | G06F 9/45558 718/1 |
| 2012/0166644 A1* | 6/2012 | Liu | G06F 9/4856 709/226 |
| 2012/0311154 A1* | 12/2012 | Morgan | H04L 12/6418 709/226 |
| 2013/0086272 A1* | 4/2013 | Chen | G06F 9/4856 709/226 |
| 2013/0111033 A1* | 5/2013 | Mao | G06F 9/5072 709/226 |
| 2013/0174152 A1* | 7/2013 | Yu | G01R 21/00 718/1 |
| 2014/0215073 A1* | 7/2014 | Dow | H04L 67/10 709/226 |
| 2014/0229949 A1* | 8/2014 | Cai | G06F 9/45533 718/1 |
| 2015/0052254 A1* | 2/2015 | Zhao | H04L 67/101 709/226 |
| 2015/0277779 A1* | 10/2015 | Devarapalli | G06F 9/45558 711/162 |
| 2015/0339156 A1* | 11/2015 | Vincent | G06F 9/4856 718/1 |
| 2015/0355924 A1* | 12/2015 | Holla | G06F 9/45558 718/1 |

OTHER PUBLICATIONS

Duncan Epping, "Yellow-Bricks: DRS Deepdive", retrieved Nov. 24, 2015, 7 pages http://www.yellow-bricks.com/drs-deepdive/.
Oracle VM User's Guide, Release 3.0 for x86, Part No. E18549-03, "Managing Server Pools", retrieved Nov. 24, 2015, 15 pages. http://docs.oracle.com/cd/E20065_01/doc.30/e18549/server_pool.htm.
Microsoft TechNet, "Configuring Performance and Resource Optimization", retrieved Nov. 24, 2015, 5 pages. <https://technet.microsoft.com/en-us/gg552992.aspx>.
A. Beloglazov et al., "Adaptive Threshold-Based Approach for Energy-Efficient Consolidation of Virtual Machines in Cloud Data Centers", MGC'2010, Nov. 29-Dec. 3, 2010, Bangalore, India, 6 pages. http://gridbus.cs.mu.oz.au/papers/AdaptiveVMCloud-MGC2010.pdf.
Nagios Enterprises, LLC, "The Nagios IT Management Software Suite", retrieved Nov. 24, 2015, 3 pages, https://www.nagios.com/products/.
Wikipedia, "Nagios", retrieved Nov. 24, 2015, 4 pages, https://en.wikipedia.org/wiki/Nagios.
Splunk Inc., "Splunk Cloud", retrieved Nov. 24, 2015, 7 pages, http://www.splunk.com/en_us/products/splunk-cloud.html.
Wikipedia, "Splunk", retrieved Nov. 24, 2015, 4 pages, https://en.wikipedia.org/wiki/Splunk.

\* cited by examiner

POLICY BASED VIRTUAL MACHINE SELECTION DURING AN OPTIMIZATION CYCLE

BACKGROUND

The present disclosure relates to migration of virtual machines, and more specifically, to policy-based virtual machine selection during an optimization cycle.

In cloud computing environments, ongoing optimization can be enabled to keep the resources across a group of hosts in the environment balanced. For example, if processor (CPU) utilization reaches a predefined threshold on a host, a cloud management platform may migrate virtual machines off of this host to another host until the host's CPU utilization is below the threshold. There are many options in choosing which virtual machines should be migrated off of a host that has reached a predefined resource threshold. However, system administrators have not been able to define policies that specify which virtual machines are selected for migration.

SUMMARY

Embodiments disclosed herein include systems, methods, and computer program products to perform an operation comprising determining that use of a system resource of a first host system exceeds a threshold, wherein the first host system executes a plurality of virtual machines in a cloud computing environment, identifying a first virtual machine, of the plurality of virtual machines, for migration based on a first migration policy, of a plurality of migration policies, wherein the plurality of migration policies specify a respective set of rules for identifying virtual machines for migration, and migrating the first virtual machine to a second host system in the cloud computing environment to reduce the use of the system resource on the first host system.

DETAILED DESCRIPTION

Migrating virtual machines takes time and resources. Therefore, for example, moving the greatest consumer of a system resource may not always provide the quickest relief to excessive use of the system resource. Embodiments disclosed herein provide cloud administrators the ability to choose between a plurality of different migration policies that are used to select virtual machines for migration when host resource thresholds have been reached. The migration policies may provide different algorithms that are used to select virtual machines. For example, a first migration policy may attempt to minimize the number of virtual machines that are selected for migration. In doing so, the first migration policy may therefore select virtual machines that are consuming the greatest amounts of host system resources. As another example, a second migration policy may be tailored to provide faster overall migration time. Therefore, the second migration policy may migrate virtual machines that consume the least amount of system resources, as quiescing and migrating these virtual machines takes the least amount of time. The migration policies may further be configured to migrate virtual machines in a more aggressive or less aggressive fashion. For example, a more aggressive policy may initially migrate a greater number of virtual machines than a less aggressive migration policy. Generally, any number of predefined or user-defined migration policies may be provided, and an administrator may select any of the policies to be applied in optimization cycles in a cloud environment.

Figure 1:
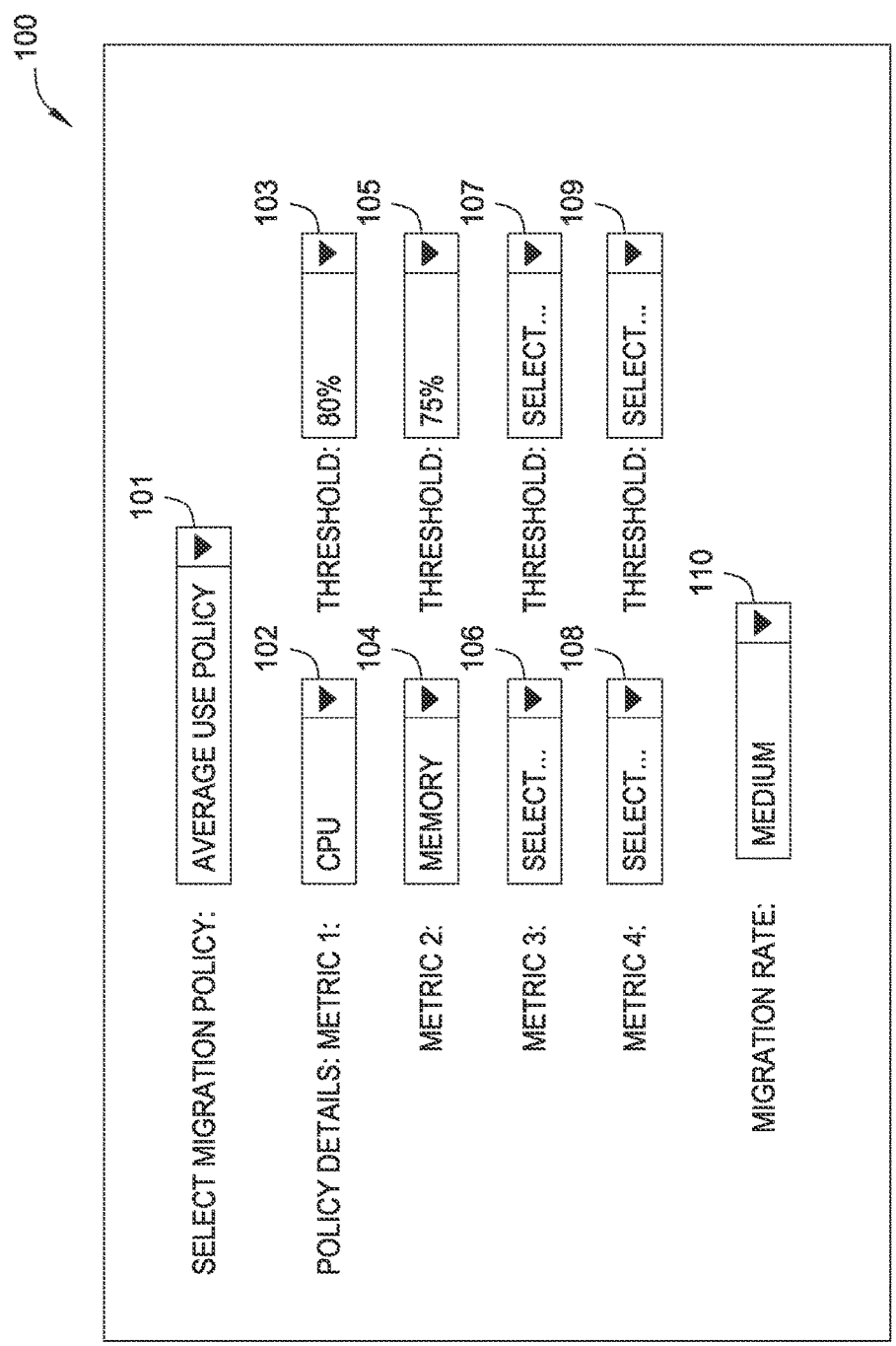
FIG. 1 illustrates a graphical user interface to configure policy-based virtual machine selection during an optimization cycle, according to one embodiment.

FIG. 1 illustrates a graphical user interface (GUI) 100 to configure policy-based virtual machine selection during an optimization cycle, according to one embodiment. The GUI 100 includes a drop-down list 100 that allows a user to select a migration policy. As shown, a user has currently selected an "average use policy." A hypervisor or cloud management application may apply the "average use policy" when selecting virtual machines to migrate when a host system experiences high use of system resources. In doing so, the hypervisor or cloud management application may select virtual machines having a resource use level that is nearest to the average use across all virtual machines executing on the host system.

As shown, the GUI 100 also includes detailed information regarding the selected policy 101. For example, a processor (CPU) metric 102 may specify a CPU threshold use 103 of 80%. Similarly, a memory metric 104 may specify a memory threshold use of 75%. Generally, when the thresholds are exceeded on a given host, the hypervisor or cloud management application may initiate a migration of one or more virtual machines from the host to a different host in the cloud to bring the resource use below the threshold. In at least one embodiment, the migration does not result in overloading the target host such that the resource metrics of the target host do not exceed their respective thresholds.

As shown, the GUI 100 also allows users to specify additional system resources (such as I/O, network bandwidth, etc.) as part of a user-defined policy 101. While metrics 106 and 108 (and associated thresholds 107 and 108) are depicted, any number of metrics may be defined for a policy 101. Similarly, a user may edit the thresholds 103 and 105 as part of a user-defined policy.

The GUI 100 also includes a migration rate 110. The migration rate 110 may be associated with an "aggressiveness" of migration, or the number of virtual machines that may be migrated as part of an optimization operation. The migration rate 110 may be any value, such as a range of virtual machines, a count of virtual machines, and the like. As shown, the current migration rate is "medium," which may be associated with a predefined number of virtual machines. A "medium" migration rate may cause the initial migration of more virtual machines than a "low" migration rate, and fewer virtual machines than a "high" migration rate. By providing the migration rate 110, the cloud management application or the hypervisor may provide flexibility in the overall migration strategy. For example, an administrator may wish to be more aggressive with the migration process to ensure that the resource use levels will fall below the threshold quickly.

Figure 2A:
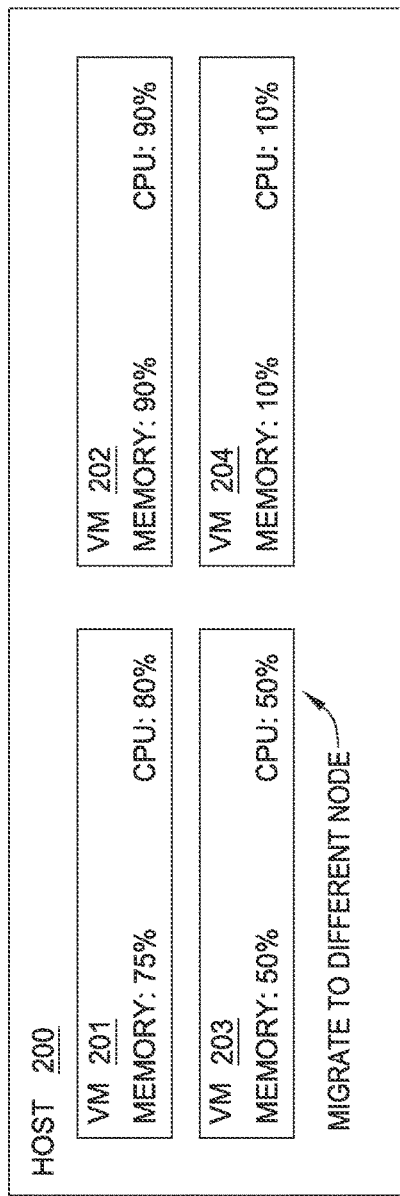
FIGS. 2A-2B illustrate a logical view of a host system configured to provide policy-based virtual machine selection during an optimization cycle, according to one embodiment.

FIG. 2A illustrates a logical view of a host system 200 configured to provide policy-based virtual machine selection during an optimization cycle, according to one embodiment. The host system 200 may be one of a plurality of hosts in a cloud computing environment (not pictured). As shown, the host 200 executes four virtual machines (VMs) 201-204. A designated component of the host 200 (such as a hypervisor) may monitor resource usage by each of the VMs 201-204. As shown, VM 201 is currently using 75% of its allocated memory and 80% of its allocated CPU, while VM 202 is currently using 90% of its allocated memory and CPU, VM 203 is using 50% of its allocated memory and CPU, and VM 204 is using 10% of its allocated memory and CPU. The use of system resources by the VMs 201-204 may individually or collectively exceed a threshold for memory and/or CPU for the host 200. In response, an optimization cycle to move one or more of the VMs 201-204 to a different host system in the cloud may be initiated. The optimization cycle may apply a migration policy to determine which of the VMs 201-204 to move to a different host. In the example depicted in FIG. 2A, the average use policy is implemented, where the VM 201-204 using the amount of resource nearest to the average use on the host 200 is migrated. The average memory use on the host 200 is 56.25%, while the average CPU use on the host 200 is 57.5%. VM 203, using 50% of its allocated memory and CPU is nearest to the average amount being used on the host 200. Therefore, VM 203 is selected for migration to a different host machine.

Figure 2B:
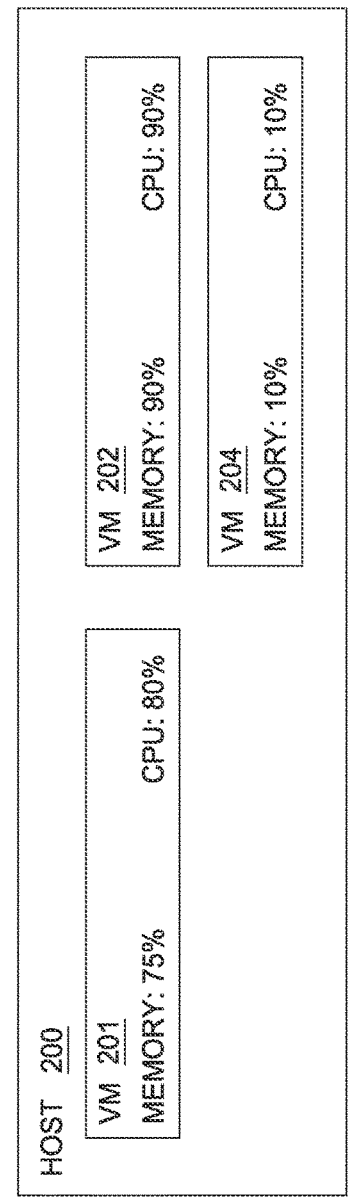

FIG. 2B illustrates the host 200 after the VM 203 has been migrated to a different host system. As shown, the host 200 now executes VMs 201, 202, and 204. If, subsequent to moving the VM 203, the resource usage on host 200 remains above the threshold (for CPU and/or memory), another VM 201, 202, 204 may be selected for migration from the host 200 using the currently applicable migration policy. Therefore, for example, if the policy is a highest use policy, VM 202 may be migrated. As another example, if the lowest use policy is in effect, VM 204 may be migrated.

Figure 3:
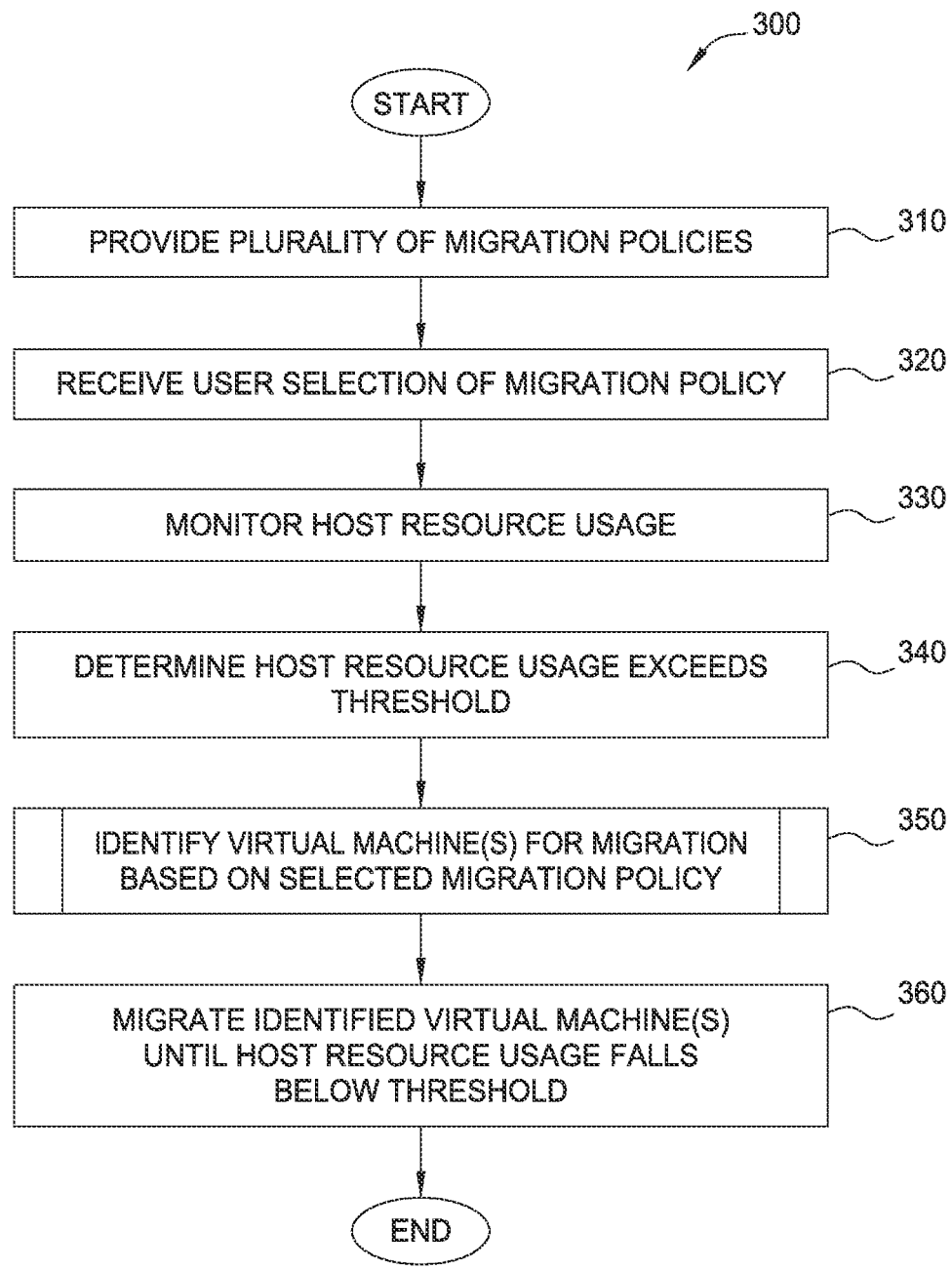
FIG. 3 is a flow chart illustrating a method to provide policy-based virtual machine selection during an optimization cycle, according to one embodiment.

FIG. 3 is a flow chart illustrating a method 300 to provide policy-based virtual machine selection during an optimization cycle, according to one embodiment. Generally, the steps of the method 300 allow users to specify a migration policy that is applied when selecting virtual machines for migration as part of an optimization cycle. As shown, the method 300 begins at step 310, where a plurality of migration policies are provided. Generally, the migration policies specify rules that are applied when selecting virtual machines for migration. The rules may be related to resource usage by virtual machines. Any number and type of migration policies may be provided. For example, a first migration policy may specify to compute a score for each virtual machine executing on a host based on each virtual machine's resource use. The virtual machines may then be ranked based on their respective scores. The first migration policy may then specify which virtual machine to select for migration, such as the highest ranked, lowest ranked, or a percentile (e.g., the virtual machine at the $25^{th}$ percentile, $50^{th}$ percentile). Similarly, a second migration policy may rank each virtual machine based on resource use (e.g., one or more of CPU, memory, I/O use). The second migration policy may then select one or more virtual machines based on a migration property, such as the VM using the least (or most) amount of resources.

At step 320, a user may select a migration policy. An indication of the selected migration policy may be stored for future use. At step 330, a hypervisor or cloud management controller may monitor resource usage on hosts in the cloud computing environment. At step 340, a determination that the host resource usage exceeds a predefined threshold. At step 350, the hypervisor or cloud management controller may identify virtual machines for migration based on the selected migration policy. At step 360, the hypervisor or cloud management controller may migrate the identified virtual machines until the host resource usage falls below the predefined threshold.

Figure 4:
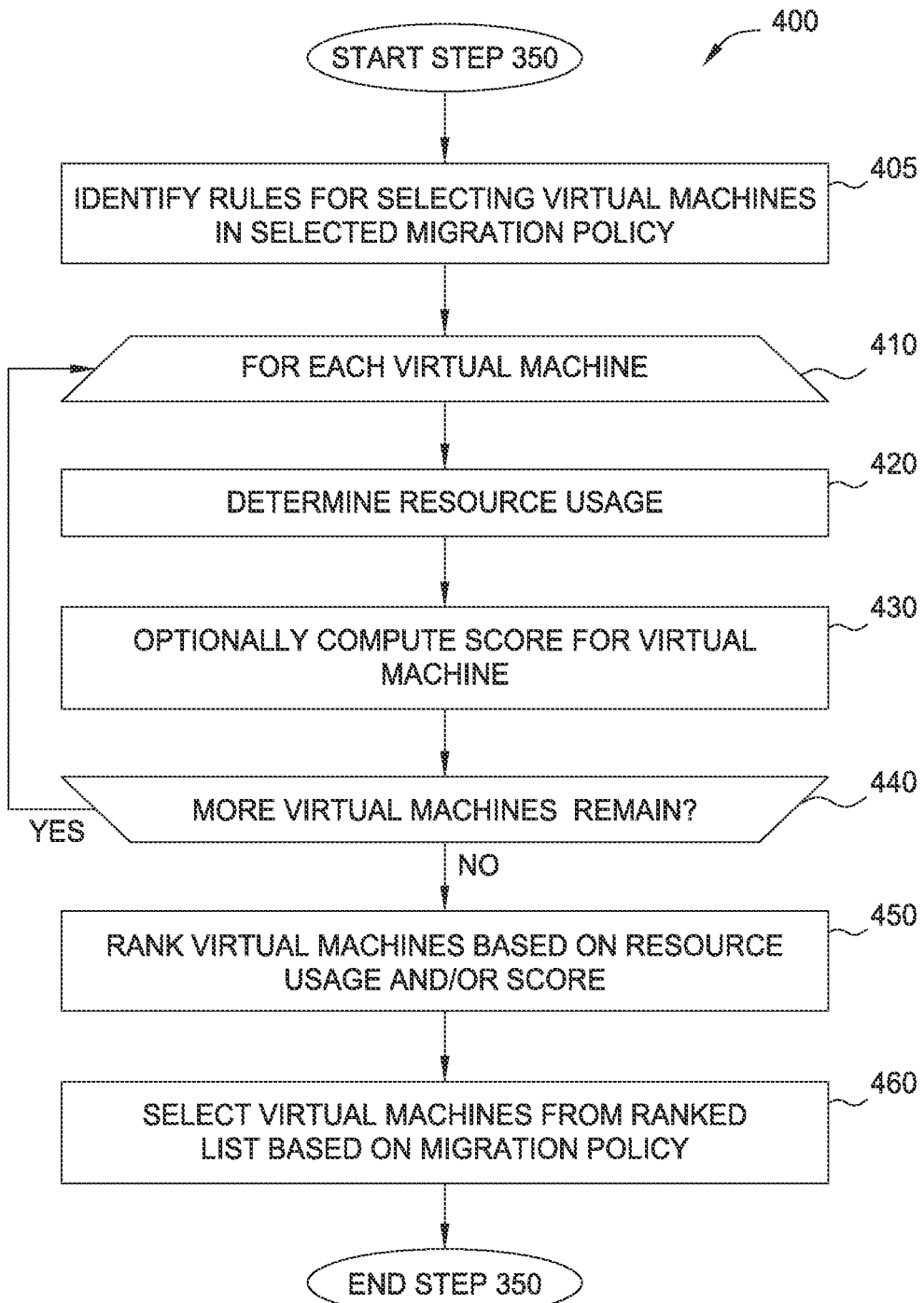
FIG. 4 is a flow chart illustrating a method to identify virtual machines for migration based on a selected migration policy, according to one embodiment.

FIG. 4 is a flow chart illustrating a method 400 corresponding to step 350 to identify virtual machines for migration based on a selected migration policy, according to one embodiment. In at least one embodiment, a hypervisor executing on a host machine may perform the steps of the method 400. In another embodiment, a cloud management controller (which may or may not be located on a host that executes virtual machines) may perform the steps of the method 400. As shown, the method 400 begins at step 405, where the rules for selecting virtual machines in the selected migration policy are identified. For example, the migration policy may specify to select the virtual machine which has the highest bandwidth usage. As another example, the migration policy may specify to select the virtual machine which uses the least RAM. At step 410, a loop including steps 420-430 is performed for each virtual machine executing on a given host. At step 420, the amount of resources the current virtual machine is using is determined. The resources may include, without limitation, I/O, CPU, memory, network bandwidth, and the like. At step 430, a score for the virtual machine may be computed. Any suitable scoring algorithm may be applied. For example, a first algorithm may weight CPU use by 0.75 and memory use by 0.25 to produce a score for the virtual machines. At step 440, if more virtual machines remain, the method returns to step 410. Otherwise, the method proceeds to step 450, where the virtual machines are ranked based on resource usage and/or the scores computed at step 430. At step 460, one or more virtual machines are selected for migration based on the currently applicable migration policy.

Figure 5:
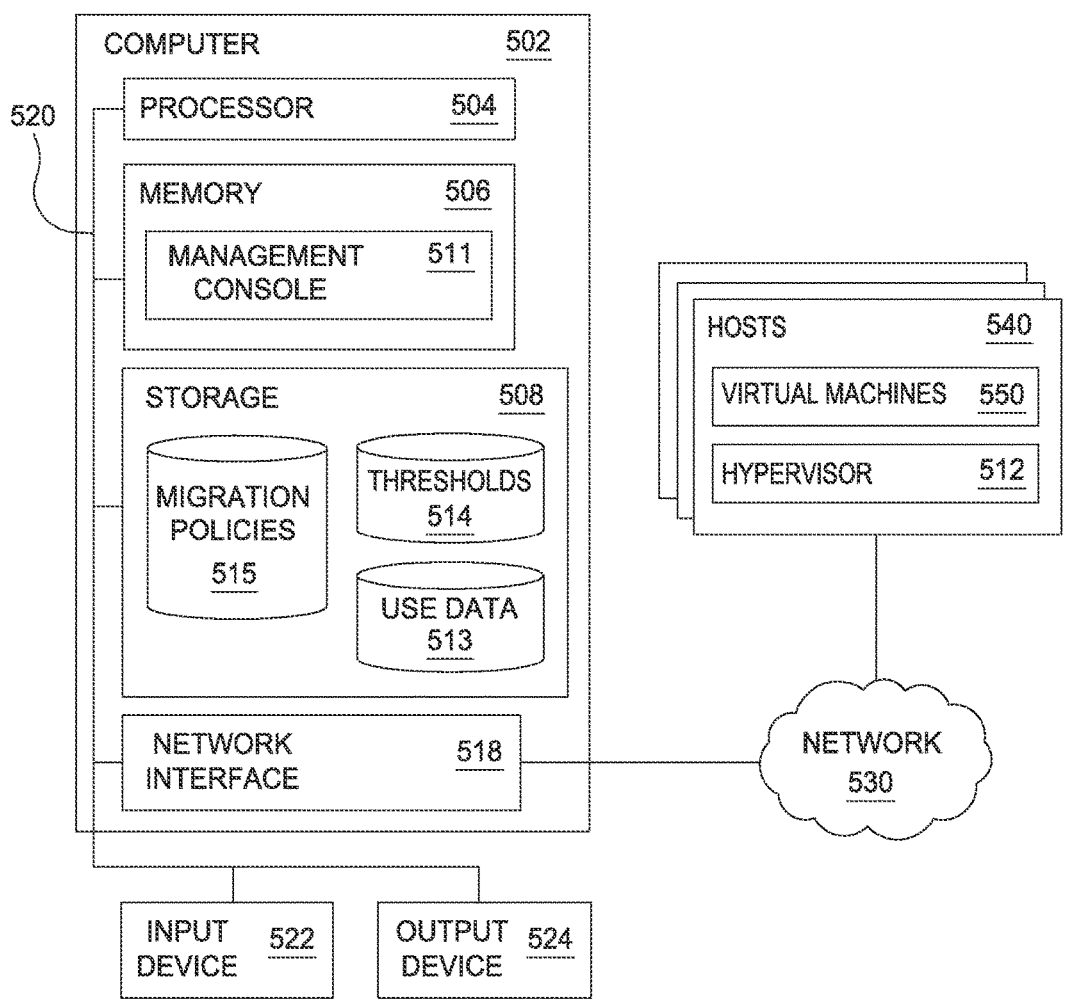
FIG. 5 is a block diagram illustrating a system configured to provide policy-based virtual machine selection during an optimization cycle, according to one embodiment.

FIG. 5 is a block diagram illustrating a system 500 configured to provide policy-based virtual machine selection during an optimization cycle, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the management console 511, which is generally configured to manage virtual machines 550 executing on hosts 540. The management console 511 allows users to select one or more migration policies 515. The management console 511 may apply the selected migration policies 515 during an optimization cycle when resource usage of a host 540 exceeds a predefined threshold. Generally, the management console 511 may apply the following pseudocode to optimize based on a selected policy:

```
For each host 540 in the cloud:
    if threshold_violated(host) = true
        vm_to_migrate = select_vm(host, policy)
        migrate_vm(vm_to_migrate, host, dest_host)
```

Where threshold_violated(host) returns true if the threshold is violated (e.g., CPU utilization exceeds 80% for X units of time), select_vm(host, policy) returns a virtual machine 550 to migrate given a host and a migration policy 515 (e.g., "highest-cpu", "lowest memory", "average I/O"), and migrate_vm(vm_to_migrate, host, dest_host) migrates the selected VM from the current host to a destination host.

As shown, the storage 508 contains the use data 513, thresholds 514, and migration policies 515. The use data 513 may store resource use metrics provided by the hypervisors 512 of each host 540. The thresholds 514 may specify resource thresholds for each host, such as 50% CPU on a first host, 60% CPU on a second host, etc. The migration polices 515 define rules for selecting virtual machines 550 for migration from one host 540 to a different host 540 when a threshold 514 is exceeded by a given host. The migration policies 515 may specify, for example, to select a virtual machine 550 having the greatest, lowest, or average resource use on a host 540. Similarly, the migration policies 515 may specify to select the virtual machine 550 having a predefined percentile use, such as $10^{th}$ percentile, $60^{th}$ percentile, and the like. The migration policies 515 may further include algorithms used by the management console 511 to compute a score for each virtual machine 550 during the optimization process.

The hosts 540 are compute nodes configured to execute one or more virtual machines 550. The hosts 540 include a hypervisor 512. Generally, a hypervisor creates, manages, and runs virtual machines on compute nodes. The hypervisors 512 may monitor resource use rates by the virtual machines 550. The hypervisors 512 may transmit the use data to the management console 511. Similarly, the hypervisors 512 may store resource thresholds 514, and notify the management console 511 when a resource threshold is exceeded.

Advantageously, embodiments disclosed herein provide different migration strategies that can be selected by an administrator of a cloud computing environment. The different migration policies allow the administrator to weigh the pros and cons of each policy to select the best migration policy for a given cloud environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
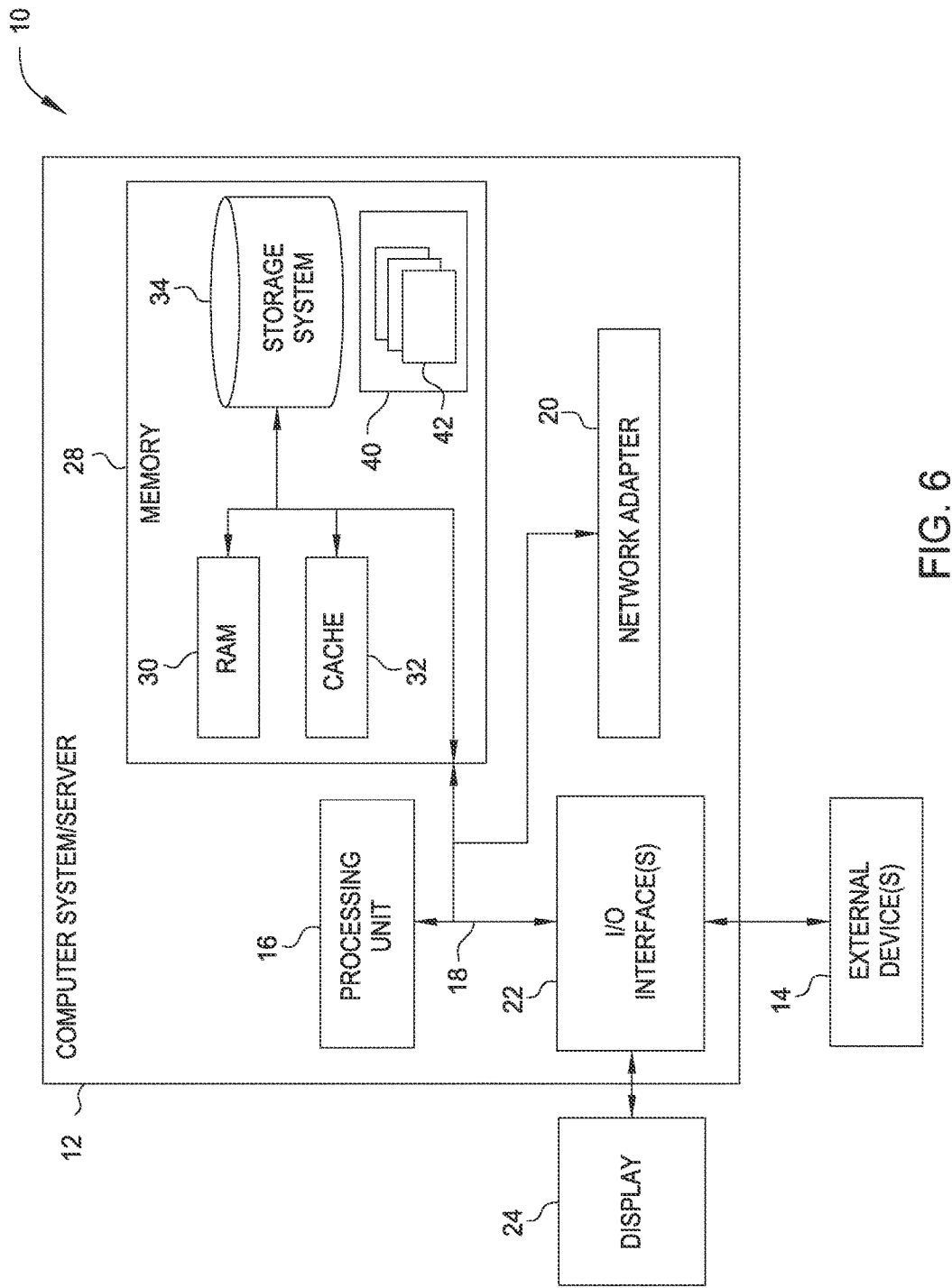
FIG. 6 depicts a cloud computing node according to one embodiment.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
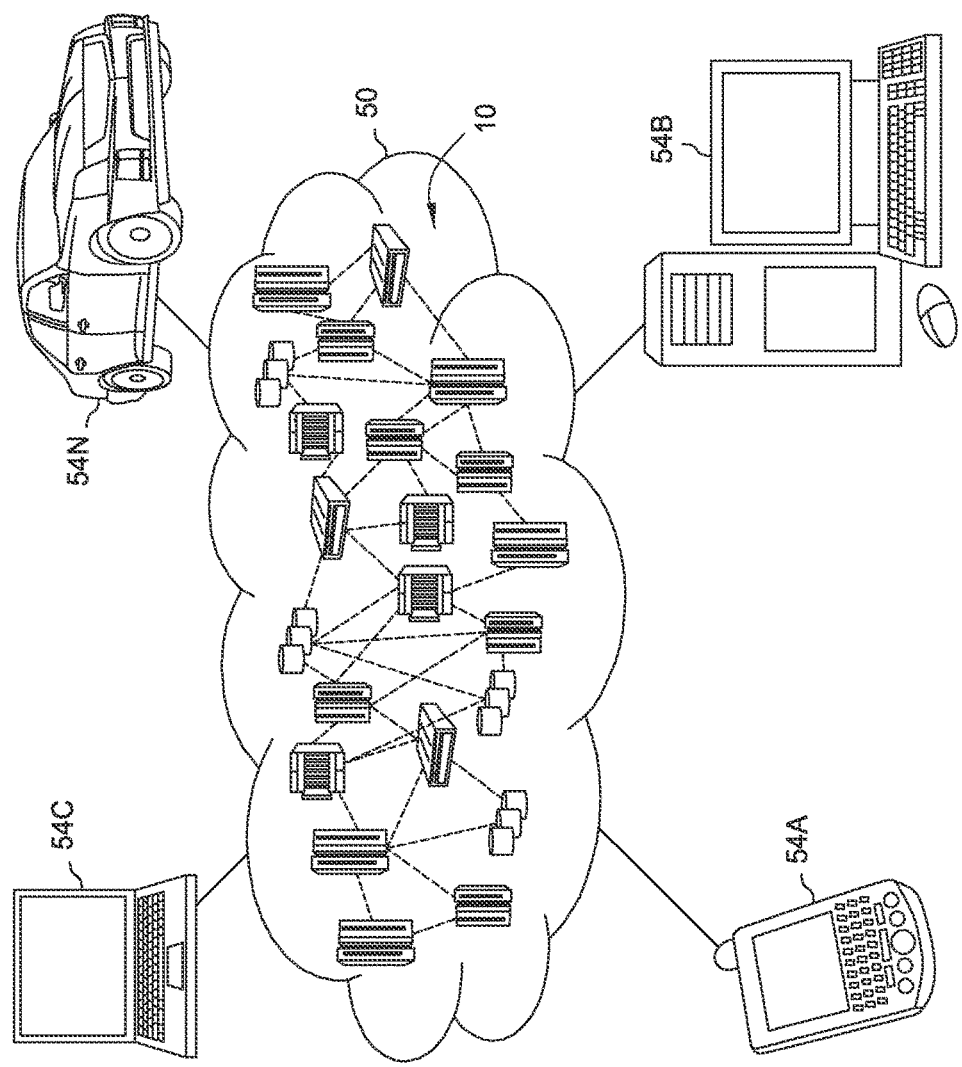
FIG. 7 depicts a cloud computing environment according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
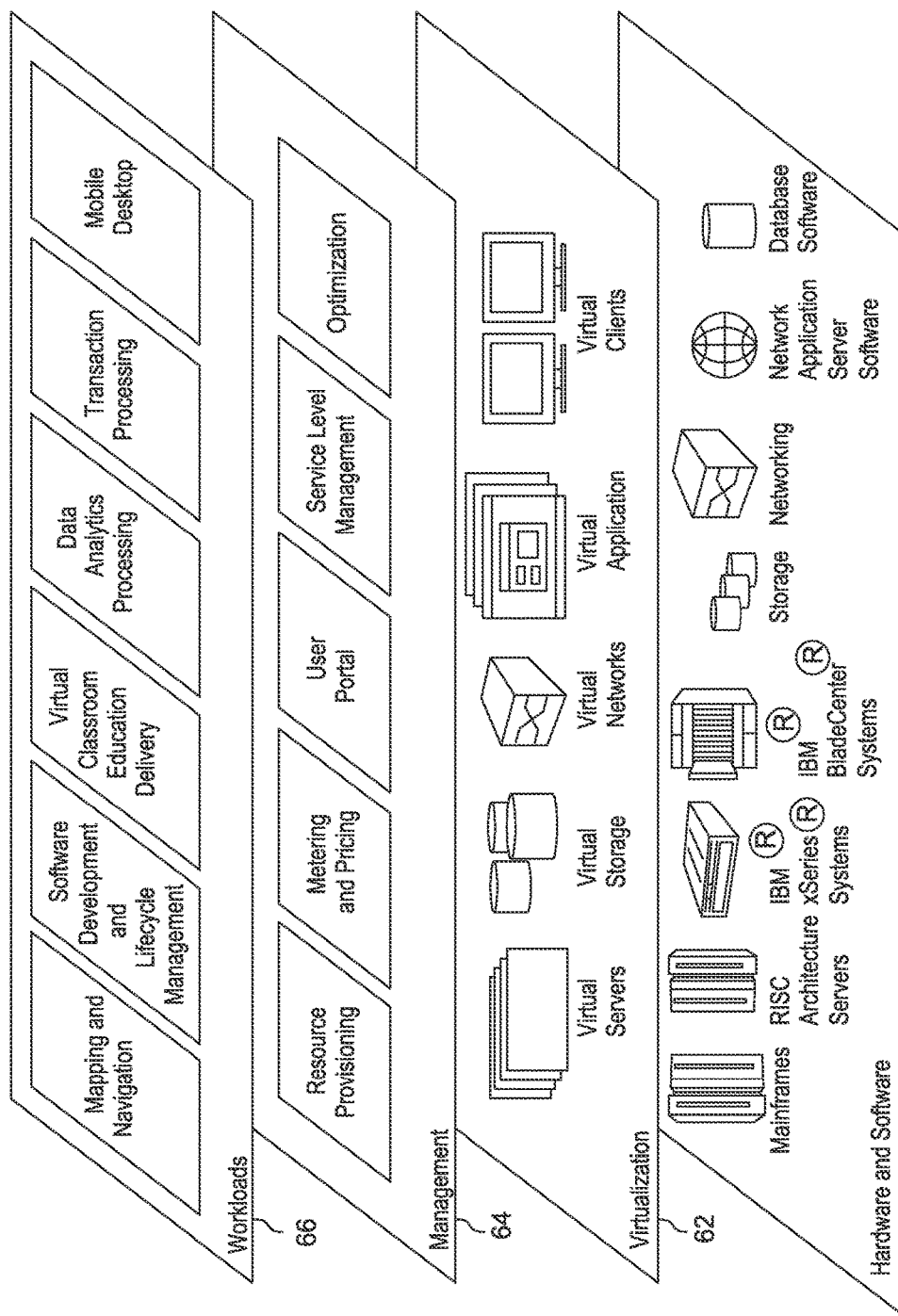
FIG. 8 depicts abstraction model layers according to one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Optimization services may migrate virtual machines from one compute node to another when resource use exceeds predefined thresholds. The optimization services may select virtual machines for migration based on the migration policies 515.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    determining that use of a first system resource of a plurality of system resources a first host system satisfies a migration condition, wherein the first host system executes a plurality of virtual machines in a cloud computing environment;
    computing a numeric score for each of the plurality of virtual machines executing on the first host system, wherein the numeric scores are of a range of scores and are computed based on an amount of the respective system resource the respective virtual machine uses, wherein the numeric scores are computed by applying a first weight to the first system resource of the plurality of system resources, a second weight to a second system resource of the plurality of system resources, and a respective weight to each of the remaining plurality of system resources;
    identifying a subset of the plurality of virtual machines for migration based on a first migration policy, of a plurality of migration policies, wherein the plurality of migration policies specify a respective set of rules for identifying virtual machines for migration, wherein a first rule of the set of rules specifies a first count of virtual machines to migrate upon determining use of the first system resource exceeds a first user defined threshold, wherein a number of virtual machines in the subset is based on the first count of virtual machines specified in the first rule, wherein the first count of virtual machines is different than a second count of virtual machines specified in a first rule of a second migration policy of the plurality of migration policies, wherein the subset comprises at least a first virtual machine and a second virtual machine of the plurality of virtual machines based on the first count, wherein a second rule of the first migration policy specifies to migrate virtual machines having the lowest use of the second system resource, wherein the first and second virtual machines are further identified based on the computed scores and the second rule of the first migration policy, wherein a first rule of a third migration policy of the plurality of migration policies specifies to migrate a third count of virtual machines to migrate upon determining use of the first system resource exceeds a second threshold, wherein a first rule of a fourth migration policy of the plurality of migration policies specifies to migrate a fourth count of virtual machines to migrate upon determining use of the first system resource exceeds a third threshold, wherein the each of the plurality of migration policies specifies to migrate a different count of virtual machines;
    determining, based on the numeric scores, that the subset of virtual machines have the lowest use of the plurality of system resources;
    outputting each of the plurality of migration policies;
    receiving a selection of the first migration policy;
    storing an indication to migrate virtual machines in the cloud computing environment based on the first migration policy; and
    migrating: (i) the first virtual machine to a second host system in the cloud computing environment, and (ii) the second virtual machine and each remaining virtual machine in the subset from the first host system, to reduce the use of the first and second system resources on the first host system.

2. The method of claim 1, wherein the second virtual machine is migrated to the second host system, the method further comprising:
    upon determining use of the first system resource of the second host system exceeds the first threshold after migrating the first and second virtual machines to the second host system:
        identifying a third virtual machine, of the subset of virtual machines, for migration based on the first migration policy; and
        migrating the second virtual machine to a third host system to reduce use of the first system resource on the first and second host systems.

3. The method of claim 1, further comprising:
    computing an average use of each of the plurality of system resources by each of the plurality of virtual machines; and
    determining that the use of each of the plurality of system resources by the virtual machines in the subset is nearest to the respective average use of the plurality of system resources relative to each of the remaining plurality of virtual machines, wherein a third rule of the set of rules of the first migration policy specifies to migrate virtual machines based on the respective average use of the plurality of system resources by each of the plurality of virtual machines.

4. The method of claim 1, the operation further comprising:
    receiving selection of the second migration policy;
    determining that a second rule of the second migration policy specifies to migrate virtual machines having the highest use of the first system resource;
    computing a second numeric score for each of the remaining plurality of virtual machines executing on the first host system, wherein the second numeric scores are based on an amount of the first system resource the respective virtual machine uses;
    determining, based on the respective second numeric scores, that a second subset of virtual machines have the highest use of the first system resource, wherein the second subset comprises a third virtual machine of the plurality of virtual machines; and
    migrating the third virtual machine from the first host system.

5. A system, comprising:
    a processor; and
    a memory storing program code, which, when executed on the processor, performs an operation comprising:
        determining that use of a first system resource of a plurality of system resources a first host system satisfies a migration condition, wherein the first host system executes a plurality of virtual machines in a cloud computing environment;
        computing a numeric score for each of the plurality of virtual machines executing on the first host system, wherein the numeric scores are of a range of scores and are computed based on an amount of the respective system resource the respective virtual machine uses, wherein the numeric scores are computed by applying a first weight to the first system resource of the plurality of system resources, a second weight to a second system resource of the plurality of system resources, and a respective weight to each of the remaining plurality of system resources;

identifying a subset of the plurality of virtual machines for migration based on a first migration policy, of a plurality of migration policies, wherein the plurality of migration policies specify a respective set of rules for identifying virtual machines for migration, wherein a first rule of the set of rules specifies a first count of virtual machines to migrate upon determining use of the first system resource exceeds a first user defined threshold, wherein a number of virtual machines in the subset is based on the first count of virtual machines specified in the first rule, wherein the first count of virtual machines is different than a second count of virtual machines specified in a first rule of a second migration policy of the plurality of migration policies, wherein the subset comprises at least a first virtual machine and a second virtual machine of the plurality of virtual machines based on the first count, wherein a second rule of the first migration policy specifies to migrate virtual machines having the lowest use of the second system resource, wherein the first and second virtual machines are further identified based on the computed scores and the second rule of the first migration policy, wherein a first rule of a third migration policy of the plurality of migration policies specifies to migrate a third count of virtual machines to migrate upon determining use of the first system resource exceeds a second threshold, wherein a first rule of a fourth migration policy of the plurality of migration policies specifies to migrate a fourth count of virtual machines to migrate upon determining use of the first system resource exceeds a third threshold, wherein the each of the plurality of migration policies specifies to migrate a different count of virtual machines;

determining, based on the numeric scores, that the subset of virtual machines have the lowest use of the plurality of system resources;

outputting each of the plurality of migration policies;

receiving a selection of the first migration policy;

storing an indication to migrate virtual machines in the cloud computing environment based on the first migration policy; and migrating: (i) the first virtual machine to a second host system in the cloud computing environment, and (ii) the second virtual machine and each remaining virtual machine in the subset from the first host system, to reduce the use of the first and second system resources on the first host system.

6. The system of claim 5, wherein the second virtual machine is migrated to the second host system, the operation further comprising:

upon determining use of the first system resource of the second host system exceeds the first threshold after migrating the first and second virtual machines to the second host system:

identifying a third virtual machine, of the subset of virtual machines, for migration based on the first migration policy; and migrating the second virtual machine to a third host system to reduce use of the first system resource on the first and second host systems.

7. The system of claim 5, the operation further comprising:

computing an average use of each of the plurality of system resources by each of the plurality of virtual machines; and determining that the use of each of the plurality of system resources by the virtual machines in the subset is nearest to the respective average use of the plurality of system resources relative to each of the remaining plurality of virtual machines, wherein a third rule of the set of rules of the first migration policy specifies to migrate virtual machines based on the respective average use of the plurality of system resources by each of the plurality of virtual machines.

8. The system of claim 5, the operation further comprising:

receiving selection of the second migration policy;

determining that a second rule of the second migration policy specifies to migrate virtual machines having the highest use of the first system resource;

computing a second numeric score for each of the remaining plurality of virtual machines executing on the first host system, wherein the second numeric scores are based on an amount of the first system resource the respective virtual machine uses;

determining, based on the respective second numeric scores, that a second subset of virtual machines have the highest use of the first system resource, wherein the second subset comprises a third virtual machine of the plurality of virtual machines; and migrating the third virtual machine from the first host system.

9. A computer program product comprising:

a non-transitory computer-readable storage medium having computer-readable program code embodied therewith, the computer-readable program code executable by one or more computer processors to perform an operation comprising:

determining that use of a first system resource of a plurality of system resources a first host system satisfies a migration condition, wherein the first host system executes a plurality of virtual machines in a cloud computing environment;

computing a numeric score for each of the plurality of virtual machines executing on the first host system, wherein the numeric scores are of a range of scores and are computed based on an amount of the respective system resource the respective virtual machine uses, wherein the numeric scores are computed by applying a first weight to the first system resource of the plurality of system resources, a second weight to a second system resource of the plurality of system resources, and a respective weight to each of the remaining plurality of system resources;

identifying a subset of the plurality of virtual machines for migration based on a first migration policy, of a plurality of migration policies, wherein the plurality of migration policies specify a respective set of rules for identifying virtual machines for migration, wherein a first rule of the set of rules specifies a first count of virtual machines to migrate upon determining use of the first system resource exceeds a first user defined threshold, wherein a number of virtual machines in the subset is based on the first count of virtual machines specified in the first rule, wherein the first count of virtual machines is different than a second count of virtual machines specified in a first rule of a second migration policy of the plurality of migration policies, wherein the subset comprises at least a first virtual machine and a second virtual machine of the plurality of virtual machines based on the first count, wherein a second rule of the first migration policy specifies to migrate virtual machines having the lowest use of the second system resource, wherein the first and second virtual machines are further identified based on the computed scores and the second rule of the first migration policy, wherein a first rule of a third migration policy of the plurality of migration policies specifies to migrate a third count of virtual machines to migrate upon determining use of the first system resource exceeds a second threshold, wherein a first rule of a fourth migration policy of the plurality of migration policies specifies to migrate a fourth count of virtual machines to migrate upon determining use of the first system resource exceeds a third threshold, wherein the each of the plurality of migration policies specifies to migrate a different count of virtual machines;

determining, based on the numeric scores, that the subset of virtual machines have the lowest use of the plurality of system resources;

outputting each of the plurality of migration policies;

receiving a selection of the first migration policy;

storing an indication to migrate virtual machines in the cloud computing environment based on the first migration policy; and migrating: (i) the first virtual machine to a second host system in the cloud computing environment, and (ii) the second virtual machine and each remaining virtual machine in the subset from the first host system, to reduce the use of the first and second system resources on the first host system.

10. The computer program product of claim 9, wherein the second virtual machine is migrated to the second host system, the operation further comprising:

upon determining use of the first system resource of the second host system exceeds the first threshold after migrating the first and second virtual machines to the second host system:

identifying a third virtual machine, of the subset of virtual machines, for migration based on the first migration policy; and migrating the second virtual machine to a third host system to reduce use of the first system resource on the first and second host systems.

11. The computer program product of claim 9, the operation further comprising:

computing an average use of each of the plurality of system resources by each of the plurality of virtual machines; and determining that the use of each of the plurality of system resources by the virtual machines in the subset is nearest to the respective average use of the plurality of system resources relative to each of the remaining plurality of virtual machines, wherein a third rule of the set of rules of the first migration policy specifies to migrate virtual machines based on the respective average use of the plurality of system resources by each of the plurality of virtual machines.

* * * * *